United States Patent [19]
Van Fleet, III

[11] Patent Number: 6,075,359
[45] Date of Patent: Jun. 13, 2000

[54] SENSOR WITH FERROMAGNETIC METAL SEALING CAP

[75] Inventor: Vern C. Van Fleet, III, Wolcott, Conn.

[73] Assignee: Echlin Inc., Branford, Conn.

[21] Appl. No.: 09/060,801

[22] Filed: Apr. 15, 1998

[51] Int. Cl.[7] .............................. G01P 1/02; G01P 3/488; G01B 7/30

[52] U.S. Cl. .................. 324/207.15; 324/174; 73/514.39

[58] Field of Search ..................................... 324/173, 174, 324/207.15, 207.16, 207.2, 207.21, 207.25, 260; 336/90, 92, 98, 110, 221; 73/493, 494, 514.39, 661

[56] References Cited

FOREIGN PATENT DOCUMENTS

| 63-131023 | 6/1988 | Japan | 324/207.15 |
|---|---|---|---|
| 4-74929 | 3/1992 | Japan | 324/174 |
| 781363 | 8/1957 | United Kingdom | 324/174 |

*Primary Examiner*—Gerard Strecker
*Attorney, Agent, or Firm*—St. Onge Steward Johnston & Reens LLC

[57] ABSTRACT

A magnetic sensor is provided having a pole piece, a sensor magnet, a housing and a ferromagnetic metal cap. The pole piece has a first end, a second end and a side wall. The sensor magnet is adjacent the first end of the pole piece. The housing is adapted to receive and contain the pole piece and the sensor magnet, and has an end wall with a hole defined by a rim. The cap has a floor with an inner surface for receiving the second end of the pole piece thereagainst and a wall extending from a periphery of the floor to a flange extending radially outward from the wall. The ferromagnetic metal cap is disposed within the hole in the housing such that a seal is formed between the rim of the hole and the wall, with the flange being embedded in the housing. The wall of the ferromagnetic metal cap is spaced apart from the side wall of the pole piece such that the wall is capable of flexing during dimensional changes of the housing due to thermal cycling to maintain the seal between the rim and the wall.

4 Claims, 2 Drawing Sheets

SENSOR WITH FERROMAGNETIC METAL SEALING CAP

FIELD OF THE INVENTION

The present invention relates to magnetic sensors, and more specifically, to a magnetic sensor having a sealing cap for protecting the sensor components from adverse ambient conditions.

BACKGROUND OF THE INVENTION

Magnetic sensors are used for a variety of applications to sense motion, position, vibration, speed and the like. Such sensors are often used in motor vehicles and marine crafts. In both cases, the sensors are often required to operate in ambient conditions which may be deleterious to sensor components. Examples of such ambient conditions include exposure to high humidity, salt water spray, corrosive fluids or fumes, temperature extremes and the like.

U.S. Pat. No. 5,416,410 to Kastler and U.S. Pat. No. 5,563,511 to Van Fleet disclose magnetic sensors with protective caps. However, in both devices the caps are formed of a magnetically impermeable, or non-magnetic, material, the use of which may interfere with operation of the sensor. Moreover, the Kastler design does not account for possible dimensional variations in sensor components due to thermal cycling. As such, leaks may develop, leading to corrosion and eventual failure of the sensor.

U.S. Pat. No. 5,486,758 to Hammerle and U.S. Pat. No. 5,585,560 to Goossens also disclose sensors having protective caps. The caps in these two prior art devices are formed from non-magnetic stainless steel, which may cause interference with sensor readings. Moreover, the two prior art designs require the use of sealing elements or o-rings in addition to the protective cap, making these designs more costly to produce.

U.S. Pat. No. 5,563,510 to Gorrell et al. and U.S. Pat. No. 5,629,618 to Babin et al. disclose sensor housings. In Gorrell et al. the sensor housing is of unitary construction and is manufactured from a polyether-imide. Similarly, the housing disclosed in Babin et al. is formed of an injection molded plastic which is overmolded after the sensor is assembled. Such designs are undesirable because, as is well known in the art, plastic housings, such as those disclosed in these two prior art devices, deleteriously affect performance of the sensor.

Finally, U.S. Pat. No. 4,797,612 to Nakanishi et al. discloses a speed detector having a removable covering to protect the inner components of the detector. The covering has a cylindrical wall which is provided with a lip extending radially outward. The lip is held in "abutting contact" with the steering knuckle of the vehicle. However, no provision is made for thermal cycling, and the area of "abutting contact" is particularly prone to leaking.

What is desired, therefore, is a magnetic sensor having a sealing cap which protects the sensor from ambient conditions that may be deleterious to sensor components without interfering with sensor performance.

SUMMARY OF THE INVENTION

Accordingly, it is an object of the present invention to provide a magnetic sensor having a sealing cap which protects the sensor from ambient conditions that may be deleterious to sensor components.

Another object of the present invention is to provide a magnetic sensor having a sealing cap of the above character in which the sealing cap does not interfere with sensor performance.

A further object of the present invention is to provide a magnetic sensor having a sealing cap of the above character in which the sealing cap is formed of a ferromagnetic material.

These and other objects of the present invention are achieved by provision of a magnetic sensor having a pole piece, a sensor magnet, a housing and a ferromagnetic metal cap. The pole piece has a first end, a second end and a side wall. The sensor magnet is adjacent the first end of the pole piece. The housing is adapted to receive and contain the pole piece and the sensor magnet, and has an end wall with a hole defined by a rim. The cap has a floor with an inner surface for receiving the second end of the pole piece thereagainst and a wall extending from a periphery of the floor to a flange extending radially outward from the wall. The ferromagnetic metal cap is disposed within the hole in the housing such that a seal is formed between the rim of the hole and the wall, with the flange being embedded in the housing. The wall of the ferromagnetic metal cap is spaced apart from the side wall of the pole piece such that the wall is capable of flexing during dimensional changes of the housing due to thermal cycling to maintain the seal between the rim and the wall.

The invention and its particular features and advantages will become more apparent from the following detailed description considered with reference to the accompanying drawings.

DETAILED DESCRIPTION OF THE INVENTION

Figure 1:
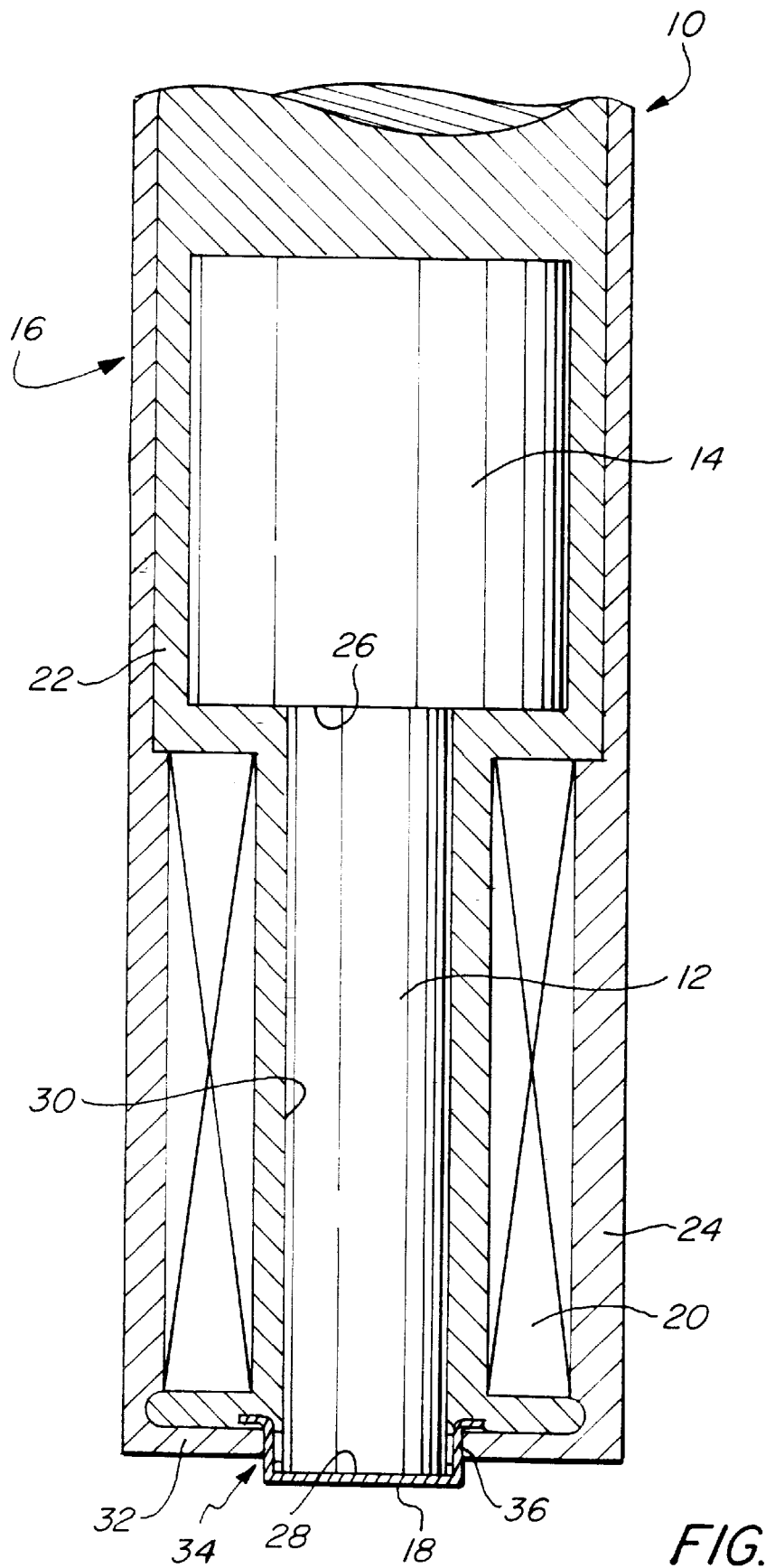
FIG. 1 is a side partially cross-sectional view of a magnetic sensor constructed in accordance with the present invention.
Figure 2:
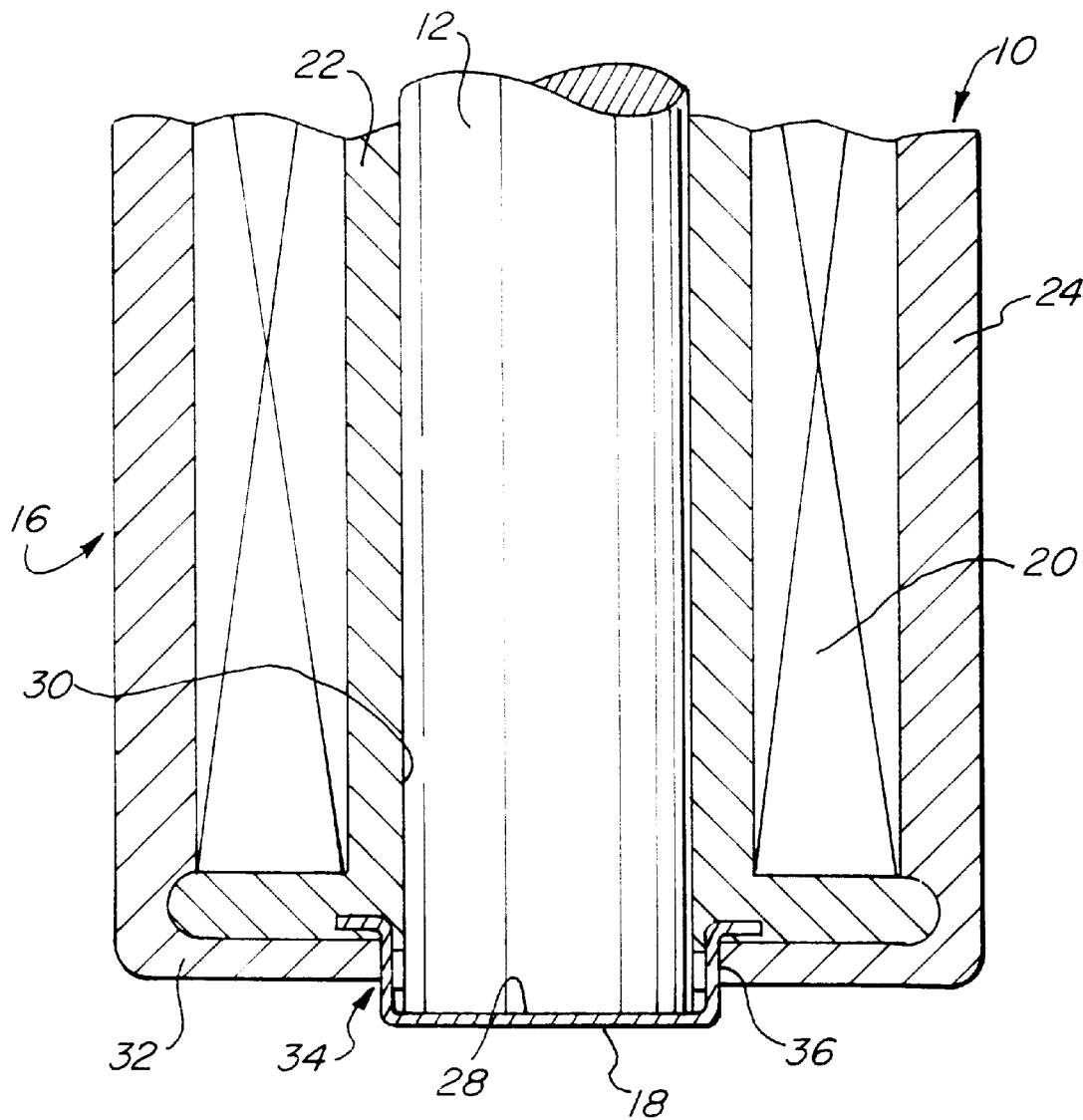
FIG. 2 is an enlarged side partially cross-sectional view of a portion of the magnetic sensor of FIG. 1; and, FIG. 3 is a side cross-sectional view of a sealing cap for use in the magnetic sensor of FIG. 1.
Figure 3:
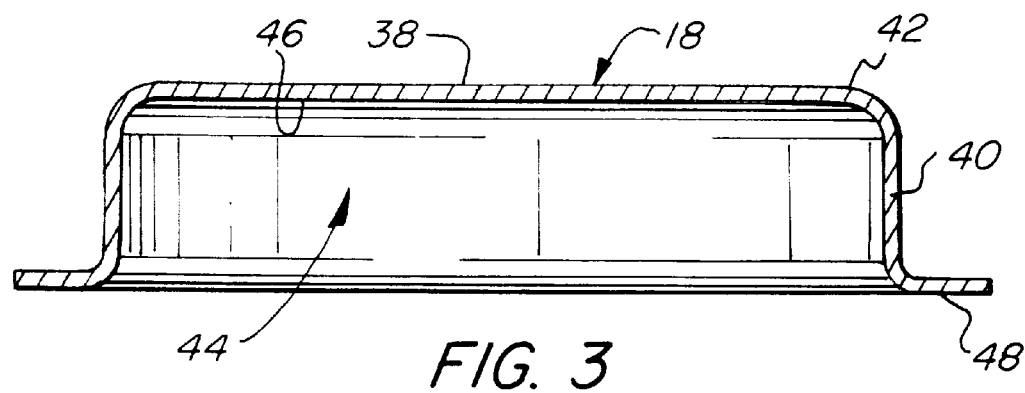

Referring first to FIGS. 1 through 3, a magnetic sensor 10 in accordance with the present invention is shown. Magnetic sensor 10 includes a pole piece 12, a sensor magnet 14, a housing 16 a ferromagnetic metal cap 18 and a coil 20. Housing 16, which comprises a bobbin overmold section 22 and a sensor overmold section 24, receives and encloses sensor magnet 14 and coil 20. Pole piece 12 includes a first end 26, a second end 28 and a side wall 30. Pole piece 12 is held in housing 16 by ferromagnetic metal cap 18, with first end 26 of pole piece 12 abutting sensor magnet 14. In this regard, housing 16 has an end wall 32 including an opening or hole 34 defined by a rim 36.

Ferromagnetic metal cap 18 includes a floor 38 and a wall 40 extending from a periphery 42 of floor 38 to form a cavity 44 for receiving second end 28 of pole piece 12 therein. As assembled, second end 28 of pole piece 12 abuts an inner surface 46 of ferromagnetic metal cap 18. Thus, pole piece 12 is held in position within magnetic sensor 10 between sensor magnet 14 and ferromagnetic metal cap 18. Wall 40 of ferromagnetic metal cap 18 includes a flange 48 which is embedded in housing 16 during overmolding.

Wall 40 and periphery 42 of floor 38 are sized to be slightly larger than side wall 30 of pole piece 12. Wall 40 is also sized to fit in sealing engagement with rim 36 of hole 34. Preferably, wall 40 slightly diverges from side wall 30 of pole piece 12 as wall 40 extends from floor 38. Thus, changes due to temperature and the like in the length or width of housing 16 will be absorbed by wall 40 with the sealing engagement between wall 40 and rim 36 of hole 34 remaining intact, thereby inhibiting leaks from developing. To further enhance leak inhibition, floor 38 and second end 28 of pole piece 12 preferably extend though hole 34 out beyond end wall 32 of housing 16, thereby facilitating flexing of wall 40.

As its name suggests, ferromagnetic metal cap 18 is formed from a ferromagnetic metal such as steel, iron, cobolt or nickel. Unlike prior art devices, such a material is desirable here due to the fact that it is the pole piece, not the sensor magnet, which is proximate to the protective cap. When the sensor magnet is proximate to the cap, as is the case with prior art devices, a cap formed from a nonmagnetic material is necessary, as the use of a ferromagnetic metal interferes with sensor performance. However, it has been found that when it is the pole piece, not the sensor magnet, which is proximate to the sealing cap, the use of a ferromagnetic metal cap not only does not interfere with, but actually enhances, sensor performance.

The present invention, therefore, provides a magnetic sensor having a sealing cap which protects the sensor from ambient conditions that may be deleterious to sensor components without interfering with sensor performance.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A magnetic sensor comprising:

a pole piece having a first end, a second end and a side wall;

a sensor magnet adjacent the first end of said pole piece;

a housing for receiving and containing said pole piece and said sensor magnet, said housing having an end wall with a hole defined by a rim; and a ferromagnetic metal cap having a floor with an inner surface for receiving the second end of said pole piece thereagainst, said cap having a wall extending from a periphery of the floor to a flange extending radially outward from the wall, said cap disposed within the hole in said housing such that a seal is formed between the rim of the hole and the wall, the flange being embedded in said housing and the wall being spaced apart from the side wall of said pole piece such that the wall is capable of flexing during dimensional changes of the housing due to thermal cycling to maintain the seal between the rim and the wall.

2. The magnetic sensor of claim 1 wherein the floor of said ferromagnetic metal cap and the second end of said pole piece extend through the hole in said housing out past the end wall.

3. A magnetic sensor comprising:

a housing having an end wall;

an opening in the end wall of said housing defined by a rim;

a sensor magnet disposed within said housing;

a pole piece having a first end, a second end and a side wall, the first end of said pole piece being adjacent said magnet and the second end of said pole piece extending out through said opening past said the end wall of said housing; and, a ferromagnetic metal cap having a floor with an inner surface for receiving the second end of said pole piece thereagainst, said cap having a wall extending from a periphery of the inner surface to a flange extending radially outward from the wall, said cap disposed within said opening such that a seal is formed between the rim of said opening and the wall, the flange being embedded in said housing and the wall being spaced apart from the side wall of said pole piece such that the wall is capable of flexing during dimensional changes of the housing due to thermal cycling to maintain the seal between the rim and the wall.

4. In a magnetic sensor comprising a pole piece having a first end, a second end and a side wall, a sensor magnet adjacent the first end of the pole piece, a housing for receiving and containing the pole piece and the sensor magnet, the housing having an end wall with a hole defined by a rim and a protective cap, the improvement comprising a magnetic sensor wherein the protective cap comprises a ferromagnetic metal protective cap having a floor with an inner surface for receiving the second end of the pole piece thereagainst, the cap having a wall extending from a periphery of the floor to a flange extending radially outward from the wall, the cap disposed within the hole in the housing such that a seal is formed between the rim of the hole and the wall, the flange being embedded in the housing and the wall being spaced apart from the side wall of the pole piece such that the wall is capable of flexing during dimensional changes of the housing due to thermal cycling to maintain the seal between the rim and the wall.

* * * * *